United States Patent Office 3,386,960
Patented June 4, 1968

3,386,960
PROCESS OF PREPARING POLYESTERS IN THE PRESENCE OF A CATALYTIC AMOUNT OF A PRASEODYMIUM COMPOUND
Maria V. Wiener, Akron, Ohio, assignor to The Goodyear Tire & Rubber Company, Akron, Ohio, a corporation of Ohio
No Drawing. Filed Jan. 10, 1963, Ser. No. 250,485
1 Claim. (Cl. 260—75)

This invention relates to the preparation of glycol esters of polycarboxylic acids. More particularly, this invention relates to the preparation of polymeric glycol esters of dicarboxylic acids and to an improvement in the method of preparing linear superpolyesters by the alcoholysis of esters of dicarboxylic acids with a glycol and the subsequent polymerization of these glycol esters to high polymeric linear polyesters.

In the preparation of linear superpolyesters, one of the most satisfactory methods from the standpoint of simplicity of reaction and economy of operation has been the ester interchange method in which esters of polycarboxylic acids are reacted with a glycol to form the glycol ester of the acid or a low molecular weight polymeric polyester which is then polymerized to a high molecular weight polymeric polyester by a condensation reaction with splitting out of glycol. This process, however, has not been entirely satisfactory because the initial ester interchange or alcoholysis reaction is slow and because most of the materials that catalyze this reaction are not effective catalysts for the subsequent condensation reaction.

In order to prepare linear polyesters of high molecular weight, it is necessary to use materials of high purity because some impurities interfere with the condensation reaction and lower the degree of polymerization to which the glycol ester can be polymerized. Very pure esters, however, do not undergo the alcoholysis reaction with pure glycols as readily as do these materials containing some impurities. Consequently, it has been necessary to find a material which will effectively catalyze the ester interchange of pure esters with pure glycols, and which will not adversely affect the condensation reaction so that high molecular weight polyesters can be formed in a reasonable time. Preferably the catalyst for the initial ester interchange reaction should also be a catalyst for the condensation reaction.

Heretofore, various materials have been proposed as catalysts for the ester interchange reaction between glycols and esters of polycarboxylic acids and for the subsequent polymerization reaction. Metals in the form of powder, chips, ribbon, or wire have been suggested, as have surface catalysts such as broken glass or silica gel. The more successful of the catalysts used in the past, however, have been the alkaline materials such as the alkali metal and alkaline earth metal alcoholates, the alkali metal carbonates, or other alkaline reacting salts, alkaline earth oxides and litharge.

Many of these materials are effective catalysts for the initial, simple ester interchange, and some of them catalyze the condensation reaction. However, there are certain disadvantages to using these materials due primarily to the nature of their physical or chemical properties. The metal and surface catalysts being present in the form of solids, incompatible with the polymer, must be removed before the polymer can be used in applications such as fibers, coatings or films. Removal of solid particles from very viscous materials such as these high molecular weight polyesters is extremely difficult.

According to the present invention, it has been found that praseodymium containing materials catalyze the ester interchange between glycols and esters of dicarboxylic acids and greatly accelerate the subsequent polymerization of the product and permit the formation in relatively short reaction times of polymers of high molecular weight.

Thus an ester of a dicarboxylic acid such as the ester of terephthalic acid or isophthalic acid can be reacted with a glycol and the resultant glycol ester condensed to form a polymer, both stages of the reaction being carried out in the presence of a praseodymium-containing material. The bis glycol ester may be prepared by any suitable method, if desired, such as by reacting the sodium or potassium salt of the acid with ethylene chlorohydrin or by reacting the acid with ethylene oxide or a large excess of the glycol, or by glycolysis of bis esters of the dicarboxylic acid with an excess of glycol using some catalyst which is a catalyst for the ester interchange but which is not a catalyst for the polymerization reaction and the bis glycol ester or a low molecular weight polymer thereof can then be polymerized according to the usual known techniques using a praseodymium-containing compound as catalyst.

The following examples illustrate the invention and show how it may be carried out:

EXAMPLE 1

A glass reaction tube approximately 35 centimeters long having an inside diameter of 38 millimeters equipped with a sidearm, a nitrogen gas inlet tube and a stirrer was charged with 58.2 grams of dimethyl terephthalate, 41 grams of ethylene glycol and catalyst as indicated in the table below. Nitrogen gas was slowly passed over the mixture and the mixture was heated by means of a vapor bath at 217° C. and stirred until the alcoholysis reaction was essentially complete. Then a vapor bath having a tempertaure of 245° C. was used and the pressure in the system was reduced over a period of 45 minutes to 1 millimeter of mercury pressure while the excess glycol was distilled out. Then a vapor bath having a temperature of 280° C. was used and the condensation reaction was carried out at 1 millimeter of mercury pressure for approximately two hours. The results obtained with the various catalysts are set out in the table below. In this table the figures in the catalyst columns indicate the weight (expressed as grams) of catalyst used.

TABLE 1

| Catalyst $Pr_6O_{11}$ | Catalyst $Sb_2O_3$ | Catalyst Zn-diacetate | Polymer Intrinsic Viscosity |
|---|---|---|---|
| 0.008 | | 0.016 | 0.629 |
| 0.014 | 0.014 | | 0.718 |
| 0.020 | | | 0.461 |
| 0.010 | 0.014 | 0.005 | 0.763 |

EXAMPLE 2

To further test the catalyst of the invention a large bath of polyester was made according to the following example.

25.3 pounds of dimethylterephthalate, 17.8 pounds of ethylene glycol, 0.00506 pound of praseodymium oxide, 0.003036 pound of zinc acetate dihydrate and 0.006325 pound of antimony trioxide were charged into a five gallon stainless steel reactor which was equipped with a stirrer, a distilling column and a temperature-measuring device. The mixture was heated and stirred at 145° C. and the temperature of the mixture was slowly raised to 245° C. as methanol distilled out. Approximately the theoretical amount of methanol was distilled out of the reaction vessel, showing the ester interchange reaction to be complete in 2½ hours. The temperature of the mixture was then raised to 270° C. and the pressure was slowly reduced to 1 millimeter of mercury pressure. The condensation reaction was run at 270° C. and 1 millimeter of mercury pressure for 2¼ hours. The polyester formed had an intrinsic viscosity of 0.689.

The term intrinsic viscosity is used herein as a measure of the degree of polymerization of the polymer. It is defined as follows:

$$\text{limit } \frac{\ln \eta_r}{C} \text{ as C approaches 0}$$

wherein $\eta_r$ is the viscosity of a dilute 60/40 phenol/tetrachloroethane mixed solvent of the polymer divided by the viscosity of the 60/40 phenol/tetrachloroethane mixed solvent itself measured under the same conditions as the copolyester solution and C is the concentration of the polyester in grams per 100 cubic centimeters of solution. The intrinsic viscosity data for the table above were obtained by determining the viscosity of a solution of 0.4 gram of the polyester dissolved in 100 cc. of the 60/40 phenol/tetrachloroethane solvent at 30.0° C.

The examples given illustrate the invention particularly with respect to the dimethyl esters and ethylene glycol. The invention will also work effectively with other esters of dicarboxylic acids such as the ethyl, propyl, butyl and phenyl esters. Other glycols such as the propylene glycols, the butylene glycols, pentamethylene glycol, hexamethylene glycol, decamethylene glycol, diethylene gycol, cyclohexane dimethanol and 2,2 bis[4(beta hydroxy-ethoxy)phenyl]propane can be used although ethylene glycol is preferred because of its low cost and ready availability.

In the practice of the invention, the preparation of the glycol ester and its subsequent polymerization is, in general, carried out in accordance with the usual known techniques. Thus, the reaction is preferably carried out in the absence of oxygen, generally in an atmosphere of an inert gas such as nitrogen or the like, in order to lessen darkening and to make it possible to obtain a high molecular weight pale or colorless product.

The invention has been illustrated with particular respect to the preparation of polymeric ethylene terephthalate. Ethylene isophthalate, ethylene, terephthalate-ethylene isophthalate copolyesters and polymeric polyesters derived from other dicarboxylic acids and glycols can be prepared using the catalysts of the invention. Representative examples of such acids from which the polyesters can be derived are aliphatic dicarboxylic acids such as adipic acid, sebacic acid and azelaic acid; aromatic dicarboxylic acids such as orthophthalic acid, isophthalic acid, terephthalic acid, 2,5-dichloro terephthalic acid, bibenzoic acid and the naphthalic acids.

The examples have illustrated the invention with respect to certain particular praseodymium-containing materials. Various praseodymium-containing materials can be used. Representative examples of such materials are praseodymium metal, praseodymium oxide, praseodymium alcoholate such as praseodymium methylate and praseodymium ethylate, praseodymium glycolate, praseodymium acetate, praseodymium formate, praseodymium oxalate and praseodymium chloride.

The praseodymium compound can be used as the sole catalyst for both the ester interchange and condensation reactions. If desired a second catalyst can be used together with the praseodymium-containing material.

The amount of catalyst used may be varied over wide concentrations. As is usual with catalysts, the amount will ordinarily be relatively small. As a general rule, the amount will be such that the catalyst contains praseodymium within the range of from 0.0001 to 0.05 gram atomic weight of praseodymium per average mol of dicarboxylic acid component used. The preferred amount of catalyst is within range containing from 0.0001 to 0.001 gram atomic weight of praseodymium per average mole of acid component used to give a satisfactory reaction rate and a product of suitable viscosity and color. The high molecular weight polymer product produced with the catalyst of the invention will have an intrinsic viscosity of at least 0.3 and generally 0.4 or higher as measured in the 60/40 phenol tetrachloroethane mixed solvent.

While certain representative embodiments and details have been shown for the purpose of illustrating the invention, it will be apparent to those skilled in this art that various changes and modifications may be made therein without departing from the spirit or scope of the invention.

I claim:

1. In a process for preparing a polymeric linear polyester by subjecting at least one bis ester of a dicarboxylic acid to alcoholysis in the presence of an excess of a glycol and thereafter subjecting the bis glycol ester formed to self-condensation with the removal of glycol, the improvement which comprises carrying out both the alcoholysis and condensation in the presence of a catalytic amount of a praseodymium compound selected from the group consisting of praseodymium metal, praseodymium oxide, praseodymium alcoholate, praseodymium glycolate, praseodymium acetate, praseodymium formate, praseodymium oxalate and praseodymium chloride.

References Cited

UNITED STATES PATENTS

| | | | |
|---|---|---|---|
| 2,647,885 | 8/1953 | Billica | 260—75 |
| 2,729,620 | 1/1956 | Sullivan | 260—75 |
| 2,850,483 | 9/1958 | Ballentine et al. | 260—75 |
| 3,118,861 | 1/1964 | Wiener | 260—75 |

OTHER REFERENCES

C. B. McGough et al., Journal of Physical Chemistry, vol. 65, pages 1887–1891 (1961).

Handbook of Chemistry and Physics, 42nd edition, pages 421 and 426 (1961).

WILLIAM H. SHORT, *Primary Examiner.*

L. P. QUAST, C. A. WENDEL, *Assistant Examiners.*